United States Patent
Kuzuhara et al.

(10) Patent No.: US 10,025,097 B2
(45) Date of Patent: Jul. 17, 2018

(54) HEAD-UP DISPLAY AND MOVING BODY EQUIPPED WITH HEAD-UP DISPLAY

(71) Applicant: PANASONIC INTELLECTUAL PROPERTY MANAGEMENT CO., LTD., Osaka (JP)

(72) Inventors: Satoshi Kuzuhara, Osaka (JP); Hiroaki Okayama, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/704,454

(22) Filed: Sep. 14, 2017

(65) Prior Publication Data
US 2018/0017790 A1 Jan. 18, 2018

Related U.S. Application Data

(63) Continuation of application No. PCT/JP2016/003030, filed on Jun. 23, 2016.

(30) Foreign Application Priority Data

Jun. 26, 2015 (JP) .................................. 2015-128944

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60K 37/02* (2013.01);
(Continued)

(58) Field of Classification Search
CPC .......................... G02B 27/01; G02B 27/0101; G02B 27/0116; G02B 27/0121; G02B 27/0127;
(Continued)

(56) References Cited

U.S. PATENT DOCUMENTS 3,533,104 A * 10/1970 Sincerbox ................. G01S 1/02
342/178
3,940,204 A 2/1976 Withrington
(Continued)

FOREIGN PATENT DOCUMENTS

GB 891255 A 3/1962
JP 3-113413 5/1991
(Continued)

OTHER PUBLICATIONS

Written Opinion of the International Searching Authority for International Application No. PCT/JP2016/003030 dated Sep. 6, 2016.
(Continued)

*Primary Examiner* — Loha Ben
(74) *Attorney, Agent, or Firm* — Greenblum & Bernstein, P.L.C.

(57) ABSTRACT

Head-up display, which is mounted on a vehicle, performs projection on a transparent reflective member, and allows an observer to visually recognize a virtual image, includes display device that displays an image, and a projection optical system that has refractive optical system and projects displayed image displayed by display device on eye box of the observer. As an angle formed between a vector of a light beam that is incident on refractive optical system and a vector of an output light beam, the angle is greater at a light beam on an image end passing through a vehicle inner side of refractive optical system than at a light beam on an image end passing through a vehicle outer side of refractive optical system.

9 Claims, 15 Drawing Sheets

(51) Int. Cl.
*B60K 37/02* (2006.01)
*G09G 5/00* (2006.01)
*G02B 27/14* (2006.01)

(52) U.S. Cl.
CPC ........ *G09G 5/00* (2013.01); *B60K 2350/1072* (2013.01); *B60K 2350/2052* (2013.01); *G02B 27/01* (2013.01); *G02B 27/14* (2013.01); *G02B 2027/013* (2013.01); *G02B 2027/0138* (2013.01); *G02B 2027/0165* (2013.01); *G02B 2027/0187* (2013.01)

(58) Field of Classification Search
CPC .............................. G02B 27/12; G02B 27/14; G02B 2027/0116; G02B 2027/0118; G02B 2027/0159; G02B 2027/0165; G02B 2027/0187; G02B 2027/013; G02B 2027/0138; B60K 35/00; B60K 37/02; B60K 37/04; B60K 2350/1072; B60K 2350/2052; G09G 5/00; G09G 2320/02; G09G 2354/00
USPC .................................. 359/630–632; 345/7–9
See application file for complete search history.

(56) References Cited

U.S. PATENT DOCUMENTS

| | | | | |
|---|---|---|---|---|
| 4,787,711 A | * | 11/1988 | Suzuki | G02B 27/0101 359/631 |
| 5,013,134 A | * | 5/1991 | Smith | B32B 17/10568 345/7 |
| 5,204,666 A | * | 4/1993 | Aoki | B60K 37/02 340/980 |
| 5,210,626 A | | 5/1993 | Kumayama et al. | |
| 5,566,025 A | * | 10/1996 | Knoll | G02B 27/0018 359/13 |
| 5,820,240 A | | 10/1998 | Ohzawa | |
| 8,289,229 B2 | * | 10/2012 | Ishikawa | G02B 27/0101 345/7 |
| 8,451,541 B2 | * | 5/2013 | Labrot | B32B 17/10036 359/630 |
| 8,477,425 B2 | * | 7/2013 | Border | G02B 27/017 353/28 |
| 8,711,485 B2 | * | 4/2014 | Schliep | G02B 27/0101 359/630 |
| 8,804,247 B2 | * | 8/2014 | Sugiyama | B60K 35/00 359/13 |
| 9,928,769 B2 | * | 3/2018 | Kuzuhara | G09G 3/007 |
| 2002/0080495 A1 | | 6/2002 | Anderson | |
| 2008/0238814 A1 | | 10/2008 | Ishikawa et al. | |

FOREIGN PATENT DOCUMENTS

| | | |
|---|---|---|
| JP | 07-008626 | 2/1995 |
| JP | 09-005668 | 1/1997 |
| JP | 2008-268883 | 11/2008 |
| JP | 2009-122582 | 6/2009 |

OTHER PUBLICATIONS

The Extended European Search Report dated Jan. 3, 2018 for European Patent Application No. 16813968.1.

\* cited by examiner

FIG. 8A

|  | Surface number | Shape | X | Y | Z | ADE | BDE | CDE |
|---|---|---|---|---|---|---|---|---|
|  |  |  |  |  |  | Eccentricity data | | |
| Display surface | 1 | Spherical surface | 0 | 0 | 0 | 0 | 0 | 0 |
| First lens | 2 | Free-form surface | 0 | 0 | -18.1558 | 0 | 0 | 0 |
|  | 3 | Free-form surface | 0 | 0 | -35.9296 | 0 | 0 | 0 |
| First mirror | 4 | Free-form surface | -8.419 | 15.323 | -131.763 | 14.255 | 3.705 | -4.391 |
| Second lens | 5 | Flat | -24.832 | 63.931 | -69.616 | 65.773 | -1.373 | 98.212 |
|  | 6 | Linear fresnel | -24.7601 | 66.66559 | -68.3852 | 65.77343 | -1.37269 | 98.2124 |
| Windshield | 7 | Free-form surface | -19.812 | 164.654 | 90.232 | 160.032 | -16.343 | 4.059 |
| Observer | 8 |  | -289.621 | -52.158 | 847.812 | 160.032 | -16.343 | 4.059 |

FIG. 8B

| Surface number | Radius of curvature |
|---|---|
| 2 | 68.2 |
| 3 | 345.3 |
| 4 | -2134.3 |
| 7 | -437.0 |

FIG. 8C

| Surface number | Radius of X curvature | Radius of Y curvature |
|---|---|---|
| 6 | -440.1 | -1000.0 |

FIG. 9A

| Surface number | Polynomial coefficient | | | | | | | | | |
|---|---|---|---|---|---|---|---|---|---|---|
| 3 | C1 | 0.000E+00 | C19 | 1.044E-08 | C37 | 0.000E+00 | C55 | 0.000E+00 |
| | C2 | 0.000E+00 | C20 | 5.388E-08 | C38 | 0.000E+00 | C56 | 0.000E+00 |
| | C3 | 0.000E+00 | C21 | 8.670E-08 | C39 | 0.000E+00 | C57 | 0.000E+00 |
| | C4 | 6.923E-04 | C22 | 6.490E-11 | C40 | 0.000E+00 | C58 | 0.000E+00 |
| | C5 | 5.595E-03 | C23 | -6.964E-11 | C41 | 0.000E+00 | C59 | 0.000E+00 |
| | C6 | 2.590E-03 | C24 | 4.962E-11 | C42 | 0.000E+00 | C60 | 0.000E+00 |
| | C7 | -1.192E-06 | C25 | 2.004E-10 | C43 | 0.000E+00 | C61 | 0.000E+00 |
| | C8 | -2.668E-05 | C26 | 7.675E-10 | C44 | 0.000E+00 | C62 | 0.000E+00 |
| | C9 | -4.740E-05 | C27 | -9.023E-10 | C45 | 0.000E+00 | C63 | 0.000E+00 |
| | C10 | -1.251E-04 | C28 | -3.652E-09 | C46 | 0.000E+00 | C64 | 0.000E+00 |
| | C11 | 2.266E-07 | C29 | 0.000E+00 | C47 | 0.000E+00 | C65 | 0.000E+00 |
| | C12 | -6.635E-07 | C30 | 0.000E+00 | C48 | 0.000E+00 | C66 | 0.000E+00 |
| | C13 | -1.257E-06 | C31 | 0.000E+00 | C49 | 0.000E+00 | | |
| | C14 | -1.048E-07 | C32 | 0.000E+00 | C50 | 0.000E+00 | | |
| | C15 | 6.592E-06 | C33 | 0.000E+00 | C51 | 0.000E+00 | | |
| | C16 | 4.297E-09 | C34 | 0.000E+00 | C52 | 0.000E+00 | | |
| | C17 | -2.125E-09 | C35 | 0.000E+00 | C53 | 0.000E+00 | | |
| | C18 | -3.282E-10 | C36 | 0.000E+00 | C54 | 0.000E+00 | | |
| 4 | C1 | 0.000E+00 | C19 | -1.938E-10 | C37 | 0.000E+00 | C55 | 0.000E+00 |
| | C2 | 0.000E+00 | C20 | -1.350E-10 | C38 | 0.000E+00 | C56 | 0.000E+00 |
| | C3 | 0.000E+00 | C21 | -2.438E-10 | C39 | 0.000E+00 | C57 | 0.000E+00 |
| | C4 | 1.479E-03 | C22 | 4.115E-14 | C40 | 0.000E+00 | C58 | 0.000E+00 |
| | C5 | -2.452E-04 | C23 | 3.235E-13 | C41 | 0.000E+00 | C59 | 0.000E+00 |
| | C6 | 1.064E-03 | C24 | -2.953E-13 | C42 | 0.000E+00 | C60 | 0.000E+00 |
| | C7 | -1.077E-07 | C25 | -7.097E-13 | C43 | 0.000E+00 | C61 | 0.000E+00 |
| | C8 | -1.835E-06 | C26 | 1.272E-13 | C44 | 0.000E+00 | C62 | 0.000E+00 |
| | C9 | 1.919E-06 | C27 | 2.636E-12 | C45 | 0.000E+00 | C63 | 0.000E+00 |
| | C10 | 2.165E-06 | C28 | -5.372E-12 | C46 | 0.000E+00 | C64 | 0.000E+00 |
| | C11 | 2.122E-09 | C29 | 4.833E-16 | C47 | 0.000E+00 | C65 | 0.000E+00 |
| | C12 | 4.357E-09 | C30 | 1.794E-15 | C48 | 0.000E+00 | C66 | 0.000E+00 |
| | C13 | 1.713E-08 | C31 | 8.769E-16 | C49 | 0.000E+00 | | |
| | C14 | -8.405E-11 | C32 | 4.862E-15 | C50 | 0.000E+00 | | |
| | C15 | -1.261E-08 | C33 | 1.006E-14 | C51 | 0.000E+00 | | |
| | C16 | -2.635E-11 | C34 | 4.066E-15 | C52 | 0.000E+00 | | |
| | C17 | -4.782E-11 | C35 | -1.744E-14 | C53 | 0.000E+00 | | |
| | C18 | -7.729E-11 | C36 | 8.868E-14 | C54 | 0.000E+00 | | |

FIG. 9B

| Surface number | Polynomial coefficient | | | | | | | |
|---|---|---|---|---|---|---|---|---|
| 7 | C1 | 0.000E+00 | C19 | 1.510E-12 | C37 | 1.800E-21 | C55 | 0.000E+00 |
| | C2 | 1.934E-01 | C20 | 6.210E-12 | C38 | 1.600E-21 | C56 | 0.000E+00 |
| | C3 | 1.755E+00 | C21 | 1.000E-11 | C39 | -1.240E-20 | C57 | 0.000E+00 |
| | C4 | 8.253E-04 | C22 | 4.270E-15 | C40 | 7.840E-21 | C58 | 0.000E+00 |
| | C5 | -8.580E-06 | C23 | -3.900E-15 | C41 | -2.190E-20 | C59 | 0.000E+00 |
| | C6 | 3.263E-04 | C24 | 5.780E-15 | C42 | -5.710E-20 | C60 | 0.000E+00 |
| | C7 | 5.360E-08 | C25 | -1.460E-14 | C43 | 5.620E-20 | C61 | 0.000E+00 |
| | C8 | 5.800E-08 | C26 | 6.040E-15 | C44 | 8.070E-23 | C62 | 0.000E+00 |
| | C9 | 1.490E-07 | C27 | 4.910E-15 | C45 | -3.960E-21 | C63 | 0.000E+00 |
| | C10 | 1.140E-06 | C28 | -2.710E-14 | C46 | 0.000E+00 | C64 | 0.000E+00 |
| | C11 | 1.460E-09 | C29 | -1.110E-18 | C47 | 0.000E+00 | C65 | 0.000E+00 |
| | C12 | 1.160E-11 | C30 | 4.430E-18 | C48 | 0.000E+00 | C66 | 0.000E+00 |
| | C13 | 2.540E-09 | C31 | 3.850E-17 | C49 | 0.000E+00 | | |
| | C14 | -8.850E-10 | C32 | 9.940E-17 | C50 | 0.000E+00 | | |
| | C15 | -9.760E-10 | C33 | 2.290E-17 | C51 | 0.000E+00 | | |
| | C16 | 8.380E-14 | C34 | -5.390E-17 | C52 | 0.000E+00 | | |
| | C17 | -6.970E-14 | C35 | -4.830E-17 | C53 | 0.000E+00 | | |
| | C18 | 3.710E-13 | C36 | 3.040E-17 | C54 | 0.000E+00 | | |

FIG. 9C

| Surface number | Aspheric coefficient | |
|---|---|---|
| 6 | K | 2.43606212 |
| | C4 | 2.2264E-06 |
| | C5 | 6.0628E-09 |
| | C6 | 2.3750E-11 |
| | C7 | 5.5567E-13 |
| | C8 | 1.3699E-15 |
| | C9 | -1.4854E-17 |
| | C10 | -5.8024E-20 |
| | C11 | 2.8936E-22 |

FIG. 10A

| Surface number | | Shape | X | Y | Z | Eccentricity data | | |
|---|---|---|---|---|---|---|---|---|
| | | | | | | ADE | BDE | CDE |
| Display surface | 1 | | 0 | 0 | 0 | 0 | 0 | 0 |
| First mirror | 2 | Free-form surface | 21.690 | -47.566 | 135.249 | -44.294 | -14.947 | -11.590 |
| Second mirror | 3 | Free-form surface | -0.517 | 14.952 | 112.929 | -96.251 | -1.101 | -17.399 |
| Second lens | 4 | Flat | 21.690 | -47.566 | 135.249 | -44.294 | -14.947 | -11.590 |
| | 5 | Linear fresnel | -0.517 | 14.952 | 112.929 | -96.251 | -1.101 | -17.399 |
| Windshield | 6 | Free-form surface | -91.155 | -291.389 | -34.731 | -62.272 | -13.415 | -21.310 |
| Observer | 7 | | -464.001 | -388.504 | -734.301 | 8.124 | -27.788 | 11.988 |

FIG. 10B

| Surface number | Radius of curvature |
|---|---|
| 2 | 792.5 |
| 3 | -2184.2 |
| 6 | -437.0 |

FIG. 10C

| Surface number | Radius of X curvature | Radius of Y curvature |
|---|---|---|
| 5 | -431.7 | -846.4 |

FIG. 11A

| Surface number | Polynomial coefficient | | | | | | | |
|---|---|---|---|---|---|---|---|---|
| 2 | C1 | 0.000E+00 | C19 | -6.017E-10 | C37 | 0.000E+00 | C55 | 0.000E+00 |
| | C2 | 0.000E+00 | C20 | -3.555E-10 | C38 | 0.000E+00 | C56 | 0.000E+00 |
| | C3 | 0.000E+00 | C21 | 2.097E-11 | C39 | 0.000E+00 | C57 | 0.000E+00 |
| | C4 | 4.538E-04 | C22 | 0.000E+00 | C40 | 0.000E+00 | C58 | 0.000E+00 |
| | C5 | 8.543E-05 | C23 | 0.000E+00 | C41 | 0.000E+00 | C59 | 0.000E+00 |
| | C6 | -1.277E-03 | C24 | 0.000E+00 | C42 | 0.000E+00 | C60 | 0.000E+00 |
| | C7 | 4.051E-06 | C25 | 0.000E+00 | C43 | 0.000E+00 | C61 | 0.000E+00 |
| | C8 | 2.178E-05 | C26 | 0.000E+00 | C44 | 0.000E+00 | C62 | 0.000E+00 |
| | C9 | 2.314E-05 | C27 | 0.000E+00 | C45 | 0.000E+00 | C63 | 0.000E+00 |
| | C10 | 2.079E-05 | C28 | 0.000E+00 | C46 | 0.000E+00 | C64 | 0.000E+00 |
| | C11 | -3.932E-08 | C29 | 0.000E+00 | C47 | 0.000E+00 | C65 | 0.000E+00 |
| | C12 | 1.811E-07 | C30 | 0.000E+00 | C48 | 0.000E+00 | C66 | 0.000E+00 |
| | C13 | -5.317E-08 | C31 | 0.000E+00 | C49 | 0.000E+00 | | |
| | C14 | -3.578E-07 | C32 | 0.000E+00 | C50 | 0.000E+00 | | |
| | C15 | -2.477E-07 | C33 | 0.000E+00 | C51 | 0.000E+00 | | |
| | C16 | 1.449E-10 | C34 | 0.000E+00 | C52 | 0.000E+00 | | |
| | C17 | 3.296E-10 | C35 | 0.000E+00 | C53 | 0.000E+00 | | |
| | C18 | -1.234E-10 | C36 | 0.000E+00 | C54 | 0.000E+00 | | |
| 3 | C1 | 0.000E+00 | C19 | -5.781E-11 | C37 | 0.000E+00 | C55 | 0.000E+00 |
| | C2 | 0.000E+00 | C20 | 1.090E-10 | C38 | 0.000E+00 | C56 | 0.000E+00 |
| | C3 | 0.000E+00 | C21 | 1.269E-10 | C39 | 0.000E+00 | C57 | 0.000E+00 |
| | C4 | 1.307E-03 | C22 | 8.476E-14 | C40 | 0.000E+00 | C58 | 0.000E+00 |
| | C5 | -6.816E-05 | C23 | 2.013E-13 | C41 | 0.000E+00 | C59 | 0.000E+00 |
| | C6 | 8.612E-04 | C24 | -9.694E-14 | C42 | 0.000E+00 | C60 | 0.000E+00 |
| | C7 | -1.925E-07 | C25 | -7.516E-15 | C43 | 0.000E+00 | C61 | 0.000E+00 |
| | C8 | -1.154E-06 | C26 | -6.546E-13 | C44 | 0.000E+00 | C62 | 0.000E+00 |
| | C9 | 1.559E-06 | C27 | -1.275E-12 | C45 | 0.000E+00 | C63 | 0.000E+00 |
| | C10 | 1.628E-06 | C28 | -1.880E-13 | C46 | 0.000E+00 | C64 | 0.000E+00 |
| | C11 | -2.334E-10 | C29 | 2.068E-16 | C47 | 0.000E+00 | C65 | 0.000E+00 |
| | C12 | 4.536E-09 | C30 | 1.460E-18 | C48 | 0.000E+00 | C66 | 0.000E+00 |
| | C13 | 7.942E-09 | C31 | -9.577E-16 | C49 | 0.000E+00 | | |
| | C14 | -1.322E-08 | C32 | 2.717E-15 | C50 | 0.000E+00 | | |
| | C15 | -1.782E-08 | C33 | 2.459E-15 | C51 | 0.000E+00 | | |
| | C16 | -5.785E-12 | C34 | 1.067E-14 | C52 | 0.000E+00 | | |
| | C17 | -8.322E-13 | C35 | 1.447E-15 | C53 | 0.000E+00 | | |
| | C18 | -5.379E-12 | C36 | -1.943E-14 | C54 | 0.000E+00 | | |

FIG. 11B

| Surface number | Polynomial coefficient | | | | | | | | |
|---|---|---|---|---|---|---|---|---|---|
| 6 | C1 | 0.000E+00 | C19 | 1.510E-12 | C37 | 1.800E-21 | C55 | 0.000E+00 |
| | C2 | 1.934E-01 | C20 | 6.210E-12 | C38 | 1.600E-21 | C56 | 0.000E+00 |
| | C3 | 1.755E+00 | C21 | 1.000E-11 | C39 | -1.240E-20 | C57 | 0.000E+00 |
| | C4 | 8.253E-04 | C22 | 4.270E-15 | C40 | 7.840E-21 | C58 | 0.000E+00 |
| | C5 | -8.580E-06 | C23 | -3.900E-15 | C41 | -2.190E-20 | C59 | 0.000E+00 |
| | C6 | 3.263E-04 | C24 | 5.780E-15 | C42 | -5.710E-20 | C60 | 0.000E+00 |
| | C7 | 5.360E-08 | C25 | -1.460E-14 | C43 | 5.620E-20 | C61 | 0.000E+00 |
| | C8 | 5.800E-08 | C26 | 6.040E-15 | C44 | 8.070E-23 | C62 | 0.000E+00 |
| | C9 | 1.490E-07 | C27 | 4.910E-15 | C45 | -3.960E-21 | C63 | 0.000E+00 |
| | C10 | 1.140E-06 | C28 | -2.710E-14 | C46 | 0.000E+00 | C64 | 0.000E+00 |
| | C11 | 1.460E-09 | C29 | -1.110E-18 | C47 | 0.000E+00 | C65 | 0.000E+00 |
| | C12 | 1.160E-11 | C30 | 4.430E-18 | C48 | 0.000E+00 | C66 | 0.000E+00 |
| | C13 | 2.540E-09 | C31 | 3.850E-17 | C49 | 0.000E+00 | | |
| | C14 | -8.850E-10 | C32 | 9.940E-17 | C50 | 0.000E+00 | | |
| | C15 | -9.760E-10 | C33 | 2.290E-17 | C51 | 0.000E+00 | | |
| | C16 | 8.380E-14 | C34 | -5.390E-17 | C52 | 0.000E+00 | | |
| | C17 | -6.970E-14 | C35 | -4.830E-17 | C53 | 0.000E+00 | | |
| | C18 | 3.710E-13 | C36 | 3.040E-17 | C54 | 0.000E+00 | | |

FIG. 11C

| Surface number | Aspheric coefficient | |
|---|---|---|
| 5 | K | 2.871282174 |
| | C4 | 2.4237E-06 |
| | C5 | 7.1605E-09 |
| | C6 | 2.9376E-12 |
| | C7 | 3.5055E-13 |
| | C8 | 6.1372E-16 |
| | C9 | -1.8863E-18 |
| | C10 | -1.5998E-20 |
| | C11 | 7.6936E-23 |

FIG. 12

|  |  | Example 1 | Example 2 |
|---|---|---|---|
| Virtual image size | X | 420.0 | 1000.0 |
|  | Y | 157.5 | 300.0 |
| Distance between observer and virtual image |  | 2100.0 | 5000.0 |

HEAD-UP DISPLAY AND MOVING BODY EQUIPPED WITH HEAD-UP DISPLAY

CROSS-REFERENCE TO RELATED APPLICATIONS

This application is a Continuation of International Patent Application No. PCT/JP2016/003030 filed Jun. 23, 2016, which claims priority of Japan Application No. JP 2015-128944 filed Jun. 26, 2015. Moreover, the disclosure of International Patent Application No. PCT/JP2016/003030 is expressly incorporated by reference herein in its entirety.

BACKGROUND

1. Technical Field

The present disclosure relates to a head-up display that performs projection on a transparent reflective member thereby presenting a virtual image.

2. Description of Related Art

Unexamined Japanese Patent Publication No. 2009-122582 discloses a head-up display that includes a projection optical system and a windshield. The projection optical system generates display light having image information and enlarges to project the display light. The windshield reflects the display light to display a virtual image. The projection optical system includes a liquid crystal panel, a projection lens group, and a concave mirror having a rotationally asymmetric aspherical surface. The liquid crystal panel generates displayed light. The projection lens group has positive power. The concave mirror is disposed so as to be eccentric with respect to the projection lens group. The projection optical system enlarges and projects the displayed light output from the liquid crystal panel while sharing power between the projection lens group and the concave mirror.

SUMMARY

The present disclosure provides a head-up display that is small-sized and suppresses a degradation in visibility.

The head-up display of the present disclosure is mounted on a vehicle, and performs projection on a transparent reflective member to allow an observer to visually recognize a virtual image. The head-up display includes a display device and a projection optical system. The display device displays an image. The projection optical system has a refractive optical system, and projects an image displayed by the display device on an eye box of the observer. The refractive optical system has an inner deflection angle that is larger than an outer deflection angle. The inner deflection angle is an angle formed between a vector of a light beam incident on the refractive optical system and a vector of a light beam output from the refractive optical system on an optical path that passes in the vicinity of an end of a vehicle inner side in a range from the display device to refractive optical system. The outer deflection angle is an angle formed between a vector of a light beam incident on the refractive optical system and a vector of a light beam output from the refractive optical system on an optical path that passes in the vicinity of a vehicle outer side in the range from the display device to refractive optical system.

The head-up display of the present disclosure is small-sized and effectively suppresses a degradation in visibility.

BRIEF DESCRIPTION OF DRAWINGS

FIG. 8A is a table showing data of a projection optical system of Example 1.

FIG. 8B is a table showing data of the projection optical system of Example 1.

FIG. 8C is a table showing data of the projection optical system of Example 1.

FIG. 9A is a table showing data of the projection optical system of Example 1.

FIG. 9B is a table showing data of the projection optical system of Example 1.

FIG. 9C is a table showing data of the projection optical system of Example 1.

FIG. 10A is a table showing data of a projection optical system of Example 2.

FIG. 10B is a table showing data of the projection optical system of Example 2.

FIG. 10C is a table showing data of the projection optical system of Example 2.

FIG. 11A is a table showing data of the projection optical system of Example 2.

FIG. 11B is a table showing data of the projection optical system of Example 2.

FIG. 11C is a table showing data of the projection optical system of Example 2.

FIG. 12 is a table showing optical data of Examples 1 and 2.

DETAILED DESCRIPTION

In the following, with reference to the drawings as appropriate, a detailed description will be given of exemplary embodiments. Note that, an excessively detailed description may be omitted. For example, a detailed description of a well-known matter or a repetitive description of substantially identical structures may be omitted. This is to avoid unnecessary redundancy in the following description, and to facilitate understanding of a person skilled in the art.

The accompanying drawings and the following description are provided for a person skilled in the art to fully understand the present disclosure, and they are not intended to limit the subject disclosed in the scope of claims.

First Exemplary Embodiment

A first exemplary embodiment will be described below with reference to FIGS. 1 to 5.

[1-1. Structure]

[1-1-1. Overall Structure of Head-Up Display]

Specific exemplary embodiments and Examples of head-up display 100 of the present disclosure will be described below with reference to the drawings.

Figure 1:
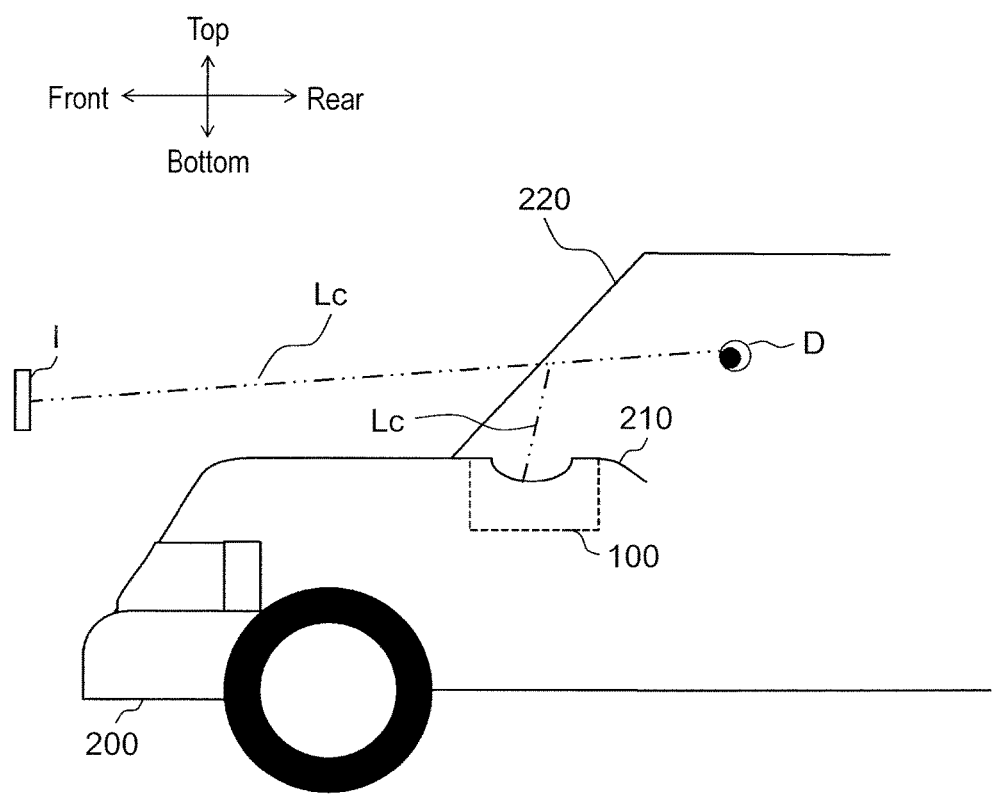
FIG. 1 is a schematic diagram illustrating a moving body equipped with a head-up display of the present disclosure.

FIG. 1 is a cross-sectional diagram illustrating vehicle 200 equipped with head-up display 100 of the present disclosure. As shown in FIG. 1, head-up display 100 is disposed inside dashboard 210 provided below windshield 220 of vehicle 200. Observer D recognizes as virtual image I displayed image 111 which is projected by head-up display 100 on windshield 220 being a reflective member.

Figure 2:
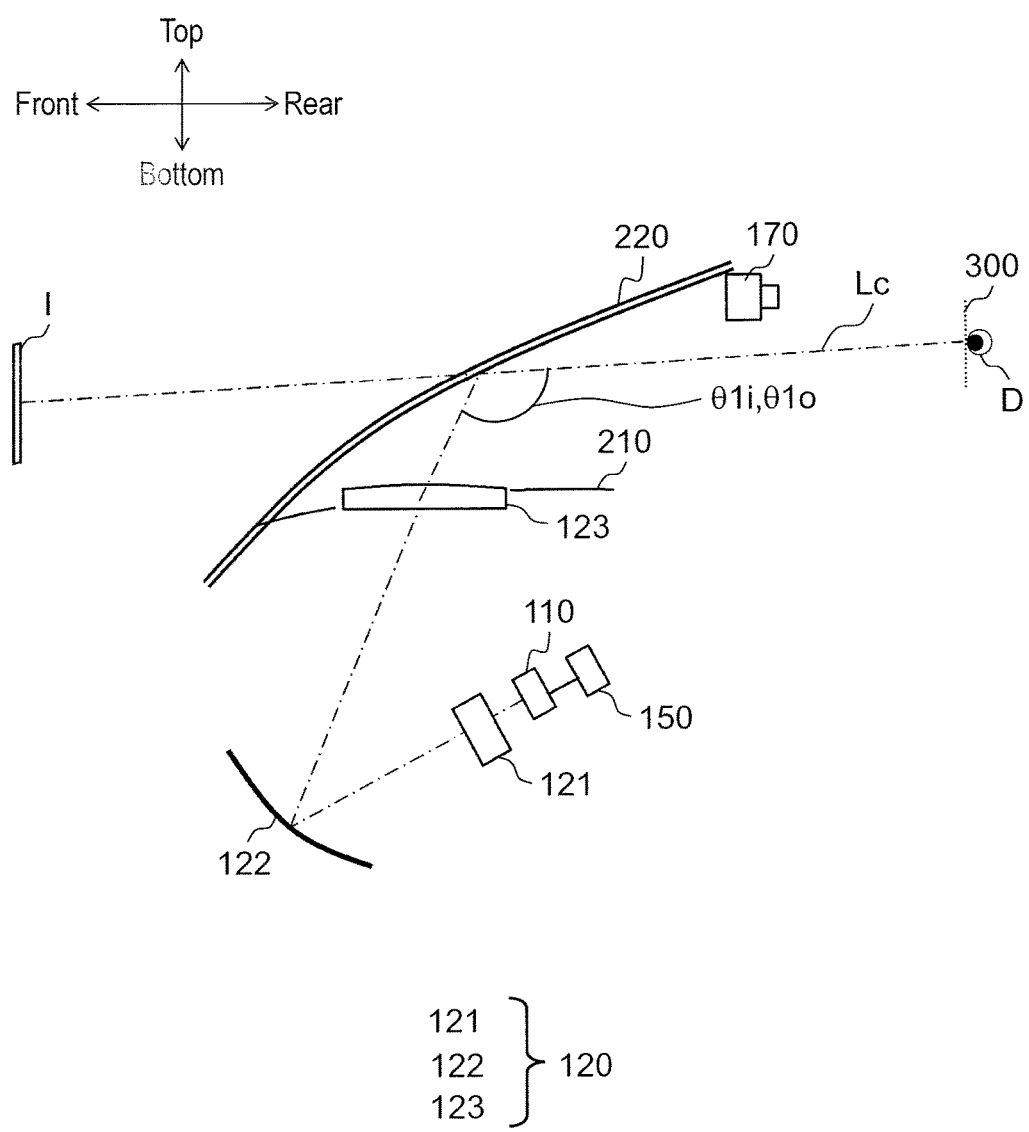
FIG. 2 is an optical cross-sectional view illustrating a structure of the head-up display according to a first exemplary embodiment.

FIG. 2 is a schematic diagram illustrating an optical cross-section for describing head-up display 100 according to the first exemplary embodiment. As shown in FIG. 2, head-up display 100 includes display device 110, projection optical system 120 (first lens 121, mirror 122, second lens 123), controller 150, and camera 170. Head-up display 100 reflects an image displayed by display device 110 via windshield 220 and guides the displayed image to eye box 300 of observer D so that observer D visually recognizes virtual image I. Eye box 300 means the region in which observer D can visually recognize complete virtual image I. Camera 170 detects the eye position of observer D.

Here, a light beam that is output from the center of virtual image I on the optical path of displayed image 111 is defined as reference light beam Lc. Reference light beam Lc visually recognized by observer D actually reaches observer D from display device 110 via the optical system. Accordingly, a light beam from display device 110 to observer D, which corresponds to reference light beam Lc output from the center of virtual image I, is also referred to as reference light beam Lc. Further, optical paths that correspond to these light beams are also referred to as reference light beam Lc. The same holds true for reference inner side light beam Li and reference outer side light beam Lo which are described later. An optical path of displayed image 111 that forms a vehicle outer side end of virtual image I is defined as reference outer side light beam Lo. An optical path of displayed image 111 that forms the vehicle inner side end of virtual image I is defined as reference inner side light beam Li. However, it is assumed that the viewpoint of observer D is at the center of eye box 300. Further, on display device 110, display positions that correspond to reference light beam Lc, reference outer side light beam Lo, and reference inner side light beam Li are referred to as reference image Dc, reference outer side image Do, and reference inner side image Di, respectively.

Display device 110 is just required to be capable of displaying an image. For example, a liquid crystal display apparatus (a liquid crystal display), an organic light emitting diode (an electroluminescence), a plasma display, or the like may be used. Further, as display device 110, an image may be formed on a screen, on which enlargement and reflection are enabled, by using a projector or a scanning laser.

Display device 110 has pixels which are formed by subordinate pixels in three colors, namely, R (red), G (green), and B (blue).

Figure 3:
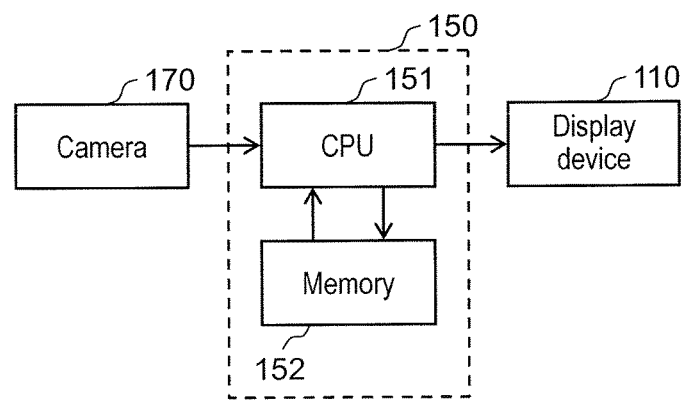
FIG. 3 is a block diagram for describing an electrical connection state of a controller of the present disclosure.
Figure 4:
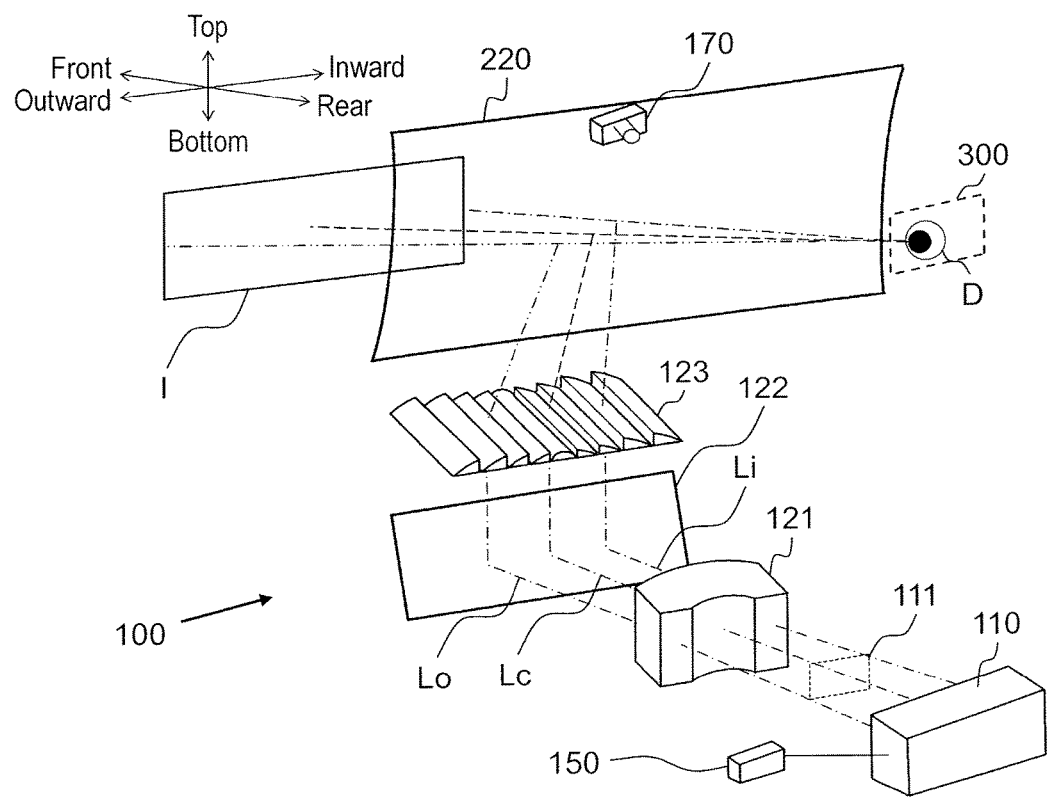
FIG. 4 is a schematic diagram for describing the structure of head-up display according to the first exemplary embodiment.

FIG. 3 is a block diagram illustrating the electrical connection state of controller 150 according of the present disclosure. As shown in FIG. 3, controller 150 includes CPU 151 and memory 152. CPU 151 controls a displayed image. A displayed image indicates various information, such as road traffic navigation display, a distance to a vehicle ahead, a remaining battery charge of the vehicle, and a current vehicle speed. Memory 152 stores a correction amount parameter for electronically correcting colors of an image displayed by display device 110, based on a power of windshield 220 and a power of projection optical system 120. Further, memory 152 stores a correction amount parameter for electronically correcting colors of an image displayed by display device 110, based on the eye position of observer D.

Controller 150 electronically distorts an image in advance in accordance with distortion that occurs at projection optical system 120 and windshield 220 so as to be capable of allowing observer D to visually recognize satisfactory virtual image I. Further, display device 110 displays display pixels of a plurality of wavelengths with the pixels being displaced for each display position based on the correction amount parameter previously stored in memory 152, in accordance with chromatic aberration that occurs at the projection optical system. Further, display device 110 is also capable of displaying display pixels of a plurality of wavelengths so that the pixels are displaced for each display position, in accordance with the eye position of observer D detected by camera 170.

Projection optical system 120 includes first lens 121, mirror 122, and second lens 123. Projection optical system 120 projects an image displayed by display device 110 on windshield 220. Specifically, image light displayed by display device 110 is input into mirror 122 via first lens 121. Image light reflected by mirror 122 is projected on windshield 220 via the second lens.

[1-1-2. Structure of Projection Optical System]

The disposition and structure of projection optical system 120 will be described below with reference to FIG. 2.

First lens 121 is disposed on the front side of vehicle 200 relative to display device 110 so as to be inclined relative to the direction perpendicular to a display surface of display device 110. First lens 121 entirely has negative power. In such a manner, an angle of a light beam output from display device 110 can be decreased, and head-up display 100 can display virtual image I satisfactorily with an entire region having high contrast while the display is small in size. Further, first lens 121 has a concave surface on display device 110 side. This reduces the input angle of a light beam, which has been output from display device 110 and incident on the surface of first lens 121 on display device 110 side, and thus an influence of distortion due to eccentricity can be decreased. However, first lens 121 on the display device 110 side does not have to entirely have a concave surface, and thus it may partially have a convex shape. Further, first lens 121 is a negative meniscus lens which has convexity at the output surface. This reduces the input angle of a light beam, which has been output from display device 110, to the lens surface of first lens 121, and thus the influence of distortion due to eccentricity can be decreased. However, the first lens 121 is not limited to a negative meniscus lens, and thus the first lens 121 may have flat and concave shapes, or both the surfaces may be concave. Further, a free-form surface shape is employed for at least one of the surfaces of first lens 121. Thus, asymmetric image distortion that occurs at mirror 122, second lens 123, and windshield 220 can be corrected in an excellent manner. However, the surface shape of first lens 121 is not limited to a free-form surface shape, and may be spherical, aspheric, toroidal, or anamorphic shape. In another manner, these lenses may be disposed eccentrically with respect to reference light beam Lc.

Mirror 122 is disposed on the front side of vehicle 200 relative to first lens 121 with its reflective surface being eccentric so as to reflect the light beam output from first lens 121 toward second lens 123. The reflective surface of mirror 122 has a concave shape. Thus, an image displayed by display device 110 can be enlarged and visually recognized as virtual image I by observer D. Further, a free-form surface shape is employed for mirror 122. This is to correct distortion of a virtual image due to reflection so that excellent virtual image I can be observed over an entire region of eye box 300. However, the surface shape of mirror 122 is not limited to a free-form surface shape, and may be spherical, aspheric, toroidal, or anamorphic shape. In another manner, these mirrors may be disposed eccentrically with respect to reference light beam Lc.

Figure 5:
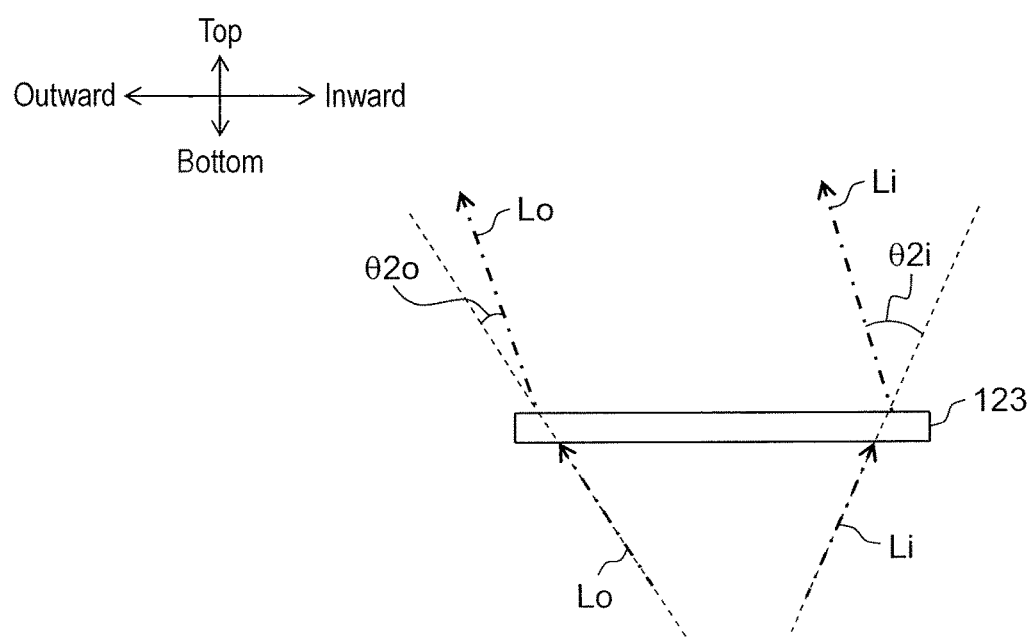
FIG. 5 is a schematic diagram for describing a second mirror according to the first exemplary embodiment.

Second lens 123 is disposed to be higher than mirror 122, and refracts a light beam reflected by mirror 122 toward windshield 220. Further, second lens 123 is disposed to be inclined relative to reference light beam Lc. This allows second lens 123 to be disposed almost horizontally, which realizes a reduction in size of a housing. Further, second lens 123 entirely has positive power. Thus, an image displayed by display device 110 can be enlarged and visually recognized as virtual image I by observer D. Further, a reduction in size of mirror 122 can be realized. Further, a free-form surface shape is employed for second lens 123. Thus, asymmetric image distortion that occurs at windshield 220 can be corrected. The surface shape of the second lens is not limited to a free-form surface shape, and may be spherical, aspheric, toroidal, or anamorphic shape. Further, as shown in FIG. 5, second lens 123 has refractive effect that is greater in an inner side of vehicle 200 than in an outer side of vehicle 200. For example, second lens 123 may have an asymmetric lens shape with greater sag on the inner side of vehicle 200. Alternatively, a rotationally symmetric lens may be disposed so that its rotationally symmetric axis is shifted toward the outer side of vehicle 200. Normally, windshield 220 has a free-form surface shape with a greater curvature on the outer side of vehicle 200. For this reason, when second lens 123 is optically symmetric between the inner side and the outer side of vehicle 200, disposition of second lens 123 approximately horizontally causes an asymmetric distortion on the windshield. Great power of second lens 123 on the inner side of vehicle 200 enables the asymmetric distortion on windshield 220 to be corrected. When second lens 123 has great power on the inner side of vehicle 200, chromatic aberration that occurs at second lens 123 becomes greater in the inner side of vehicle 200 than in the outer side of the vehicle 200. Accordingly, virtual image I is visually recognized by observer D as an image with asymmetric chromatic aberration. Then, when an image is displayed by display device 110, display device 110 displays the image while displacing the display position by pixels corresponding to the predetermined correction amount for each wavelength. This can reduce a color shift of virtual image I due to chromatic aberration. Further, a correction amount parameter that is asymmetric with a center of a displayed image is provided in order that display device 110 electronically corrects chromatic aberration. Specifically, a correction amount parameter is greater in reference inner side image Di than in reference outer side image Do. As a result, even when asymmetric chromatic aberration occurs at second lens 123, excellent virtual image I can be visually recognized by observer D.

Further, when a position of the viewpoint of observer D in eye box 300 shifts, it is desirable that the asymmetric correction amount parameter is also changed. That is to say, the viewpoint of observer D shifts from the center to the inner side of vehicle 200, a correction amount of reference inner side image Di is increased, and a correction amount of reference outer side image Do is decreased. On the contrary, when the eye position of observer D shifts from the center to the outer side of vehicle 200, the correction amount of reference inner side image Di is decreased, and the correction amount of reference outer side image Do is increased. Thus, even when the position of the viewpoint of observer D changes, excellent virtual image I can be visually recognized by observer D.

Further, the output surface of second lens 123 has a Fresnel facet. Further, the Fresnel facet of second lens 123 has ridges that linearly extend in the front-rear direction of vehicle 200. This can reduce the thickness of second lens 123, so that head-up display 100 can be reduced in size. The shape of the second lens is not limited to a linear Fresnel shape, and may be a Fresnel shape in which grooves are circularly disposed, or may be a bulk lens shape without any grooves. Further, second lens 123 has a curvature which is greater in the right-left direction of the vehicle than in the front-rear direction of the vehicle. This enables correction of asymmetric distortion that occurs at first mirror 122a and windshield 220.

In projection optical system 120, since first lens 121 of negative power as a whole is disposed on the immediately output side of display device 110, the power of first mirror 122a can be enhanced (a so-called telephoto effect). Thus, head-up display 100 can be reduced in size.

Further, in the first exemplary embodiment, while one first lens 121 is disposed on the immediately output side of display device 110, a plurality of lens elements may be disposed. Further, in the first exemplary embodiment, while one mirror 122 is disposed on the immediately output side of first lens 121, a plurality of mirrors may be disposed. Still further, in the first exemplary embodiment, while one second lens 123 is disposed on the immediately output side of mirror 122, a plurality of lens elements may be disposed, or lens elements does not have to be disposed.

Here, first lens 121 is disposed to be higher than a lower end of the reflective surface of mirror 122. This allows head-up display 100 to have a reduced thickness in the top-bottom direction of vehicle 200. Further, an interval of reference light beam Lc between display device 110 and first lens 121 is shorter than an interval between mirror 122 and first lens 121. This suppresses an amount of chromatic aberration that occurs at first lens 121 from fluctuating in eye box 300.

[1-2. Effect and Others]

Head-up display 100 according to the first exemplary embodiment projects an image displayed by display device 110 on windshield 220 and displays virtual image I for observer D. As a result, the image displayed by display device 110 can be allowed to be visually recognized by observer D without preventing forward visibility of observer D.

Figure 7:
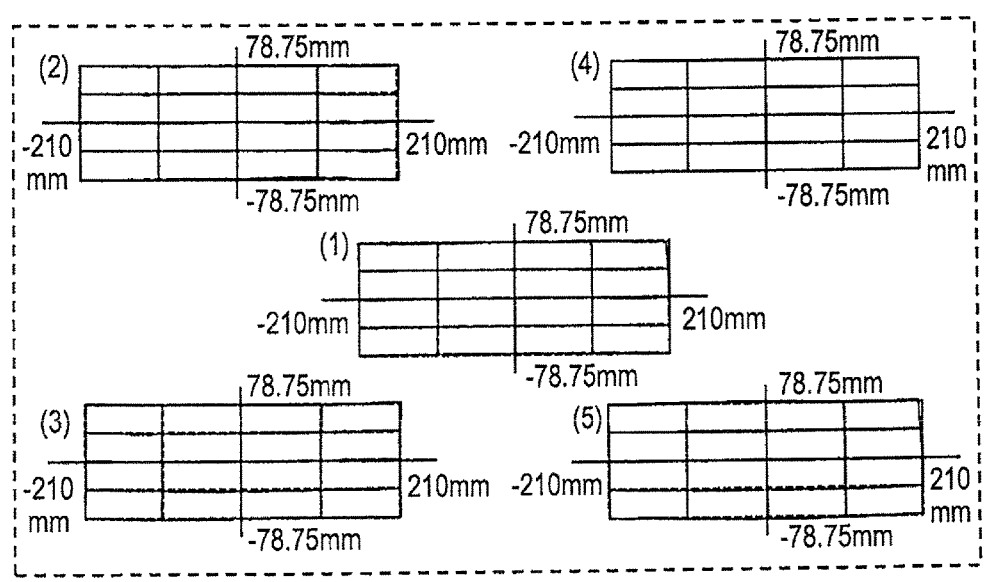
FIG. 7 in (1) to (5) are diagrams each illustrating a virtual image of head-up display 100 according to the first exemplary embodiment.

FIG. 7 is a schematic diagram when virtual image I is viewed from eye box 300 in the first exemplary embodiment. In head-up display 100 of the present disclosure, eye box 300 has a rectangular shape of 40 mm length×130 mm width. A broken line represents an ideal shape of virtual image I viewed from eye box 300. A solid line represents virtual image I projected by using head-up display 100 according to each exemplary embodiment.

FIGS. 7(1) to 7(5) are diagrams each illustrating image distortion of virtual image I viewed from observer D. (1) is a diagram illustrating image distortion when observer D views virtual image I from a center position of eye box 300. (2) is a diagram illustrating image distortion when observer D views virtual image I from an upper left position of eye box 300. (3) is a diagram illustrating image distortion when observer D views virtual image I from a lower left position of eye box 300. (4) is a diagram illustrating image distortion when observer D views virtual image I from an upper right position of eye box 300. (5) is a diagram illustrating image distortion when observer D views virtual image I from a lower right position of eye box 300.

As shown in FIG. 7, in head-up display 100 of the present disclosure, image distortion is satisfactorily corrected on the entire region of eye box 300. That is to say, even when observer D observes an image in any position within eye box 300, observer D can visually recognize satisfactorily virtual image I.

An image to be displayed by display device 110 is electronically distorted in advance, and satisfactory virtual image I can be visually recognized.

[1.3. Preferable Conditions]

Conditions which are desirably satisfied by head-up display 100 according to first exemplary embodiment will be described below. A plurality of preferable conditions is stipulated for head-up display 100 according to the exemplary embodiments, and a structure that satisfies all the conditions is most preferable. However, optical systems that exhibit respective effects can be achieved also by satisfying individual conditions.

Head-up display 100 according to the first exemplary embodiment includes display device 110 that displays an image, and projection optical system 120 that projects the image displayed by display device 110. Projection optical system 120 has first lens 121, mirror 122, and second lens 123 that are disposed in this order on an optical path next to display device 110.

In head-up display 100 of the present disclosure, it is desirable that first lens 121 entirely has a negative power. This can reduce the angle of a light beam output from the display device, so that a high-contrast image can be visually recognized over the entire region of eye box 300 of observer D.

In head-up display 100 of the present disclosure, first lens 121 on the side of display device 110 preferably has a concave shape. This reduces an input angle of a light beam having been output from display device 110 to the surface of first lens 121 on display device 110 side, so that image distortion can be corrected in an excellent manner.

In head-up display 100 of the present disclosure, first lens 121 preferably has a negative meniscus shape. This reduces an input angle of a light beam, which has been output from display device 110, to the surface of first lens 121, so that image distortion can be corrected in an excellent manner.

In head-up display 100 of the present disclosure, at least one of surfaces of first lens 121 preferably has a free-form surface shape. Thus, image distortion that occurs at windshield 220 can be corrected in an excellent manner, and thus an image with reduced image distortion can be visually recognized over the entire region of eye box 300 of observer D.

In head-up display 100 of the present disclosure, first lens 121 preferably has greater power in the right-left direction of the vehicle than in the top-bottom direction of the vehicle. Thus, a high-contrast satisfactory image can be visually recognized over the entire region of eye box 300 which is normally set to be laterally longer.

In head-up display 100 of the present disclosure, mirror 122 desirably has a free-form surface shape. Thus, image distortion that occurs at windshield 220 can be corrected in an excellent manner, and thus an image with reduced image distortion can be visually recognized over the entire region of eye box 300 of observer D.

In head-up display 100 of the present disclosure, a reflective surface of mirror 122 has a concave surface. Thus, the image displayed by display device 110 can be enlarged and visually recognized as virtual image I by observer D.

Second lens 123 of head-up display 100 of the present disclosure is desirably disposed so as to be inclined with respect to reference light beam Lc. Thus, second lens 123 can be disposed almost horizontally, so that head-up display 100 can be more compact.

Second lens 123 of head-up display 100 of the present disclosure desirably has a linear Fresnel shape having grooves in the right-left direction of the vehicle. This can reduce the thickness of second lens 123, so that head-up display 100 can be reduced in size.

Second lens 123 of head-up display 100 of the present disclosure desirably has a free-form surface shape. Thus, image distortion that occurs at windshield 220 can be corrected in an excellent manner, and thus an image with reduced image distortion can be visually recognized over the entire region of eye box 300 of observer D.

Second lens 123 of head-up display 100 according to the present disclosure desirably has its shape set or is disposed as being shifted, so that power is greater on the vehicle inner side than on the vehicle outer side. Thus, image distortion that occurs at windshield 220 with great curvature on the vehicle outer side can be corrected in an excellent manner, so that a satisfactory image with reduced image distortion can be visually recognized over the entire region of eye box 300 of observer D. Second lens 123 of head-up display 100 of the present disclosure desirably has greater power in the right-left direction of the vehicle than in the front-rear direction of the vehicle. Thus, image distortion that occurs at windshield 220 can be corrected in an excellent manner, and thus an image with reduced image distortion can be visually recognized over the entire region of eye box 300 of observer D.

In head-up display 100 of the present disclosure, display device 110 desirably shifts an image having two or more wavelengths by pixels corresponding to the predetermined correction amount, and displays the image. Thus, chromatic aberration that occurs at second lens 123 can be electronically corrected, and observer D can be allowed to visually recognize satisfactory virtual image I having less chromatic aberration.

Head-up display 100 of the present disclosure desirably adjusts the image correction amount of display device 110 according to a position of observer D, and displays an image. Thus, observer D can visually recognize satisfactory virtual image I with less chromatic aberration over the entire region of eye box 300.

In head-up display 100 of the present disclosure, one pixel is formed by three subordinate pixels in three colors, namely, R (red), G (green), B (blue). At this time, the image correction amount is desirably larger in the subordinate pixel corresponding to blue than in the subordinate pixel corresponding to red. Thus, chromatic aberration that occurs at second lens 123 can be satisfactorily corrected, and virtual image I can be allowed to be visually recognized by observer D.

Second Exemplary Embodiment

A second exemplary embodiment will be described below with reference to FIG. 6.

[2-1. Structure]

[2-1-1. Overall Structure of Head-Up Display]

Figure 6:
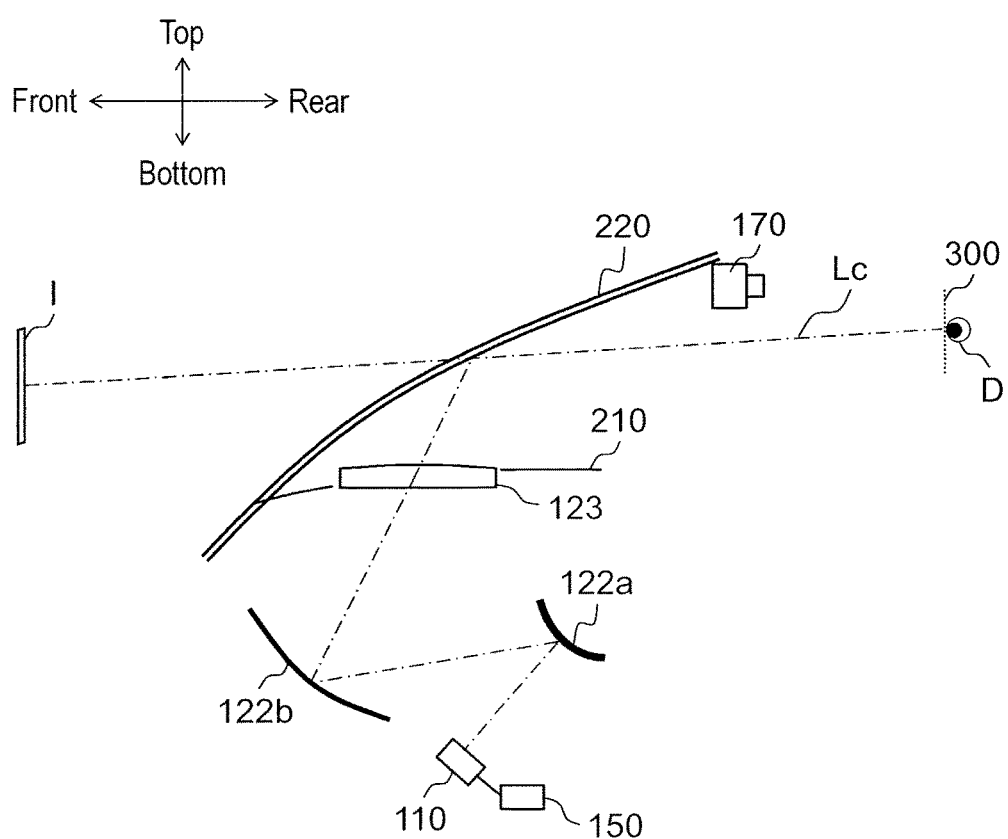
FIG. 6 is an optical cross-sectional view illustrating the structure of a head-up display according to a second exemplary embodiment.

FIG. 6 is a schematic diagram illustrating an optical cross section for describing head-up display 100 according to the second exemplary embodiment. As shown in FIG. 6, head-up display 100 includes display device 110 and projection optical system 120 (first mirror 122a, second mirror 122b, and second lens 123). Head-up display 100 projects an image displayed by display device 110 on windshield 220 and guides the image to eye box 300 so that observer D visually recognizes virtual image I. Eye box 300 is the region in which observer D can visually recognize complete virtual image I.

An optical path of displayed image 111 forming a center of virtual image I is defined as reference light beam Lc. However, it is assumed that the viewpoint of observer D is at the center of eye box 300.

Projection optical system 120 includes first mirror 122a, second mirror 122b, and second lens 123. Projection optical system 120 projects an image displayed by display device 110 on windshield 220. Specifically, image light displayed by display device 110 is incident on first mirror 122a. Image light reflected by first mirror 122a is incident on second mirror 122b. Image light reflected by second mirror 122b is projected on windshield 220 via second lens 123.

[2-1-2. Structure of Projection Optical System]

First mirror 122a is disposed to be higher than display device 110, and its reflective surface is eccentric so as to reflect a light beam output from display device 110 toward second mirror 122b. Here, the reflective surface of first mirror 122a has a convex shape. Thus, asymmetric distortion that occurs at second mirror 122b can be satisfactorily corrected. However, first mirror 122a is not limited to have the convex shape, and may have a flat or concave shape. Further, a free-form surface shape is employed for first mirror 122a. This is to correct distortion of a virtual image due to reflection so that satisfactory virtual image I can be observed over an entire region of eye box 300. However, first mirror 122a is not limited to have a free-form surface shape, and may have a spherical, aspheric, toroidal, or anamorphic shape. In another manner, these mirrors may be disposed to be eccentric with respect to reference light beam Lc.

Second mirror 122b is disposed on the front side of vehicle 200 relative to the first lens 121 with its reflective surface being eccentric so as to reflect a light beam output from first mirror 122a toward windshield 220. Here, the reflective surface of second mirror 122b has a concave shape. Thus, an image displayed by display device 110 can be enlarged and visually recognized as virtual image I by observer D. Further, a free-form surface shape is employed for second mirror 122b. Thus, distortion of virtual image I due to reflection can be corrected so that satisfactory virtual image I can be observed all over eye box 300. However, second mirror 122b is not limited to have a free-form surface shape, and may have a spherical, aspheric, toroidal, or anamorphic shape. In another manner, these mirrors may be disposed to be eccentric with respect to reference light beam Lc.

Second lens 123 is disposed to be higher than second mirror 122b, and refracts a light beam reflected by second mirror 122b toward windshield 220. Further, second lens 123 is disposed to be inclined relative to reference light beam Lc. This allows second lens 123 to be disposed almost horizontally, which realizes a reduction in size of a housing. Further, second lens 123 entirely has positive power. Thus, an image displayed by display device 110 can be enlarged and visually recognized as virtual image I by observer D. Further, second mirror 122b can be reduced in size. Further, a free-form surface shape is employed for second lens 123. Thus, asymmetric image distortion that occurs at windshield 220 can be corrected. The surface shape of the second lens is not limited to a free-form surface shape, and may be spherical, aspheric, toroidal, or anamorphic shape. Further, second lens 123 has its shape set or is disposed as being shifted, so that the refractive effect is greater in the vehicle inner side than in the vehicle outer side. For example, second lens 123 may have an asymmetric shape with a greater sag on the vehicle center side. Alternatively, second lens 123 may be a rotationally symmetric lens having its rotational symmetry axis shifted to the vehicle outer side. Normally, the windshield has a free-form surface shape having greater curvature on the vehicle outer side. When second lens 123 is disposed almost horizontally, asymmetric distortion can be corrected by providing higher power on the vehicle inner side. At this time, chromatic aberration that occurs at second lens 123 becomes greater in the vehicle inner direction than in the vehicle outer direction. Accordingly, virtual image I is visually recognized by observer D as an image with asymmetric chromatic aberration. Then, when an image is displayed by display device 110, display device 110 displays the image while displacing the display position by pixels corresponding to the predetermined correction amount for each wavelength. This can reduce a color shift of virtual image I due to chromatic aberration. Further, a parameter that is asymmetric with a center of a displayed image is provided in order that display device 110 electronically corrects chromatic aberration. Specifically, the correction amount is greater in reference inner side image Di than in reference outer side image Do. As a result, even when asymmetric chromatic aberration occurs at second lens 123, satisfactory virtual image I can be visually recognized by observer D. Further, the output surface of second lens 123 has a Fresnel facet. Further, the Fresnel facet of second lens 123 has ridges that linearly extend in the front-rear direction of vehicle 200. This can reduce the thickness of second lens 123, so that head-up display 100 can be reduced in size. The shape of the second lens is not limited to a linear Fresnel shape, and may be a Fresnel shape in which grooves are circularly disposed, or may be a bulk lens shape without any grooves.

While two mirrors are disposed in projection optical system 120, three or more mirrors may be disposed, or one mirror may be disposed. Further, while first mirror 122a is disposed on the vehicle rear side relative to second mirror 122b in the second exemplary embodiment, the present disclosure is not limited thereto. First mirror 122a may be disposed on the vehicle front side relative to second mirror 122b, or may be disposed in the vehicle right-left direction (the direction perpendicular to FIG. 6). Further, while display device 110 is disposed to be lower than first mirror 122a in the second exemplary embodiment, the present disclosure is not limited thereto. Display device 110 may be disposed to be higher than first mirror 122a, or may be disposed in the vehicle rear side or in the vehicle right-left direction (the direction perpendicular to FIG. 6).

Here, a lower end of first mirror 122a is disposed to be higher than a lower end of the reflective surface of second mirror 122b. This allows head-up display 100 to have a reduced thickness in the vehicle top-bottom direction.

Desirable conditions that are satisfied by head-up display 100 of the present disclosure will be described below.

Head-up display 100 of the present disclosure desirably satisfies the following Condition (1):

$$1.2 < (\theta 2i \times \theta 1o)/(\theta 2o \times \theta 1i) < 6.0 \quad (1)$$

Here, $\theta 1i$ is an angle formed between a vector of a reference inner side light beam that is incident on the windshield and a vector of a reference inner side light beam reflected from the windshield;

$\theta 1o$ is an angle formed between a vector of a reference outer side light beam incident on the windshield and a vector of a reference outer side light beam reflected from the windshield;

$\theta 2i$ is an angle formed between a vector of reference inner side light beam Li that is incident on second lens and a vector of reference inner side light beam Li output from the second lens; and $\theta 2o$ is an angle formed between a vector of reference outer side light beam Lo that is incident on the second lens and a vector of reference outer side light beam Lo that is output from the second lens.

Condition (1) stipulates a ratio between the refractive effect at second lens 123 of reference outer side light beam Lo and reference inner side light beam Li and an input angle to the windshield. With a value smaller than the lower limit of Condition (1), the refractive effect on the vehicle inner side of second lens 123 degrades, and it becomes difficult to provide head-up display 100 of a small size.

Further, with a value greater than the upper limit of Condition (1), the refractive effect on the vehicle inner side of second lens 123 becomes excessively strong, and it becomes difficult to satisfactorily correct image distortion that occurs at windshield 220.

Still further, satisfaction of the following Condition (1)' further enhances the above-described effect:

$$1.6 < (\theta 2i \times \theta 1o)/(\theta 2o \times \theta 1i) < 4.0 \quad (1)'$$

Still further, satisfaction of the following Condition (1)" further enhances the above-described effect:

$$2.0 < (\theta 2i \times \theta 1o)/(\theta 2o \times \theta 1i) < 3.0 \quad (1)''$$

Head-up display 100 of the present disclosure desirably satisfies the following Condition (2):

$$1.5 \leq (Mi \times \theta 1o)/(Mo \times \theta 1i) \quad (2)$$

Here, $\theta 1i$ is an angle formed between a vector of a reference inner side light beam that is incident on the windshield and a vector of a reference inner side light beam reflected from the windshield;

$\theta 1o$ is an angle formed between a vector of a reference outer side light beam incident on the windshield and a vector of a reference outer side light beam reflected from the windshield;

Mi is a correction amount of reference inner side image Di; and

Mo is a correction amount of reference outer side image Do.

Condition (2) stipulates a ratio between the correction amount of reference inner side image Di and reference outer side image Do, and an input angle of reference inner side light beam Li and reference outer side light beam Lo to windshield 220. Normally, windshield 220 has curvature greater toward the vehicle outer side, and second lens 123 compensates for image distortion that occurs at windshield 220. For this reason, second lens 123 desirably has a greater curvature on the vehicle inner side. For example, as in Condition (2), the correction amount of reference inner side image Di is desirably great. With a value smaller than a lower limit of Condition (2), the correction amount of reference inner side image becomes insufficient for chromatic aberration that occurs at second lens 123, and it becomes difficult to allow observer D to visually recognize satisfactory virtual image I. Further, the power of second lens 123 on the vehicle inner side is reduced for allowing observer D to visually recognize satisfactory virtual image I, and it becomes difficult to provide head-up display 100 of a small size.

Satisfaction of the following Condition (2)' further enhances the above-described effect:

$$1.5 \leq Mi/Mo \leq 6.0 \quad (2)'$$

With a value greater than an upper limit of Condition (2)', the correction amount at the reference inner side image for chromatic aberration that occurs at second lens 123 becomes excessive, and it becomes difficult to allow observer D to visually recognize excellent virtual image I.

Still further, satisfaction of the following Condition (2)" further enhances the above-described effect:

$$2.0 \leq Mi/Mo \leq 5.0 \quad (2)''$$

A plurality of preferable conditions is obtained for head-up display 100 according to the exemplary embodiments, and a structure that satisfies all the conditions is most preferable. However, optical systems that exhibit respective effects can be obtained also by satisfying individual conditions.

Numerical Examples

Numerical Examples corresponding to the first and second exemplary embodiments will be shown below with reference to FIGS. 8A to 11C.

Specific examples of the display device according to the present technique will be described below. In the following Examples, the unit of length in tables is (mm) and the unit of angle is (degrees). Further, the free-form surface is defined by the following mathematic expression:

$$z = \frac{cr^2}{1 + \sqrt{1-(1+k)c^2r^2}} + \sum_{m,n} C_j x^m y^n (m \geq 0, n \geq 0, m+n > 0)$$

$$j = \frac{(m+n)^2 + m + 3n}{2} + 1$$

[Mathematic Expression 1]

Here, z is a sag at position (x, y) from axis defining a surface, r is a radius of curvature at an origin on the axis defining a surface, c is a curvature at the origin on the axis defining a surface, k is a conic constant which corresponds to $C_1$ of the polynomial coefficient, $C_j$ (j>1) is a coefficient of monomial $x^m y^n$, and m and n are integers equal to or greater than 0.

Further, in Examples, a coordinate origin being the reference is a center of an image (displayed surface) displayed by display device 110. In the tables, a horizontal direction on the display surface is X-axis, a vertical direction on the display surface is Y-axis, and a direction perpendicular to the display surface is Z-axis. Further, in eccentricity data, ADE refers to an amount of rotation of a mirror or a lens from Z-axis direction to Y-axis direction about X-axis; BDE refers to an amount of rotation from X-axis direction to Z-axis direction about Y-axis; and CDE refers to an amount of rotation from X-axis direction to Y-axis direction about Z-axis.

Numerical Example 1

FIGS. 8A to 9C show data of the projection optical system of Example 1 (the first exemplary embodiment). FIG. 8A shows eccentricity data at surfaces of the optical elements of projection optical system 120. FIGS. 8B and 8C show radius of curvature. FIG. 9A shows polynomial coefficients.

Numerical Example 2

FIGS. 10A to 11C show data of the projection optical system of Example 2 (the second exemplary embodiment). FIG. 10A shows eccentricity data at surfaces of the optical elements of projection optical system 120. FIGS. 10B and 10C show radius of curvature.

Corresponding values of Conditional Expressions (1) and (2) of the first and second exemplary embodiments are shown in the following Table 1.

TABLE 1

|  | Example 1 | Example 2 |
|---|---|---|
| Conditional Expression (1) | 2.56 | 2.32 |
| Conditional Expression (2) | 3.05 | 2.58 |

Other Exemplary Embodiments

The first and second exemplary embodiments have been described above as illustrations of the technique disclosed in the present application. However, the technique disclosed in the present disclosure is not limited thereto, and is applicable also to any exemplary embodiment obtained by making changes, replacement, addition, omission and the like. Further, it is also possible to newly obtain an exemplary embodiment through combination of the structure elements described in the first and second exemplary embodiments.

As for the deflection angle formed between the vector of the light beam incident on the refractive optical system and the vector of the output light beam, the deflection angle at a light beam that passes through the vehicle inner side is larger than the deflection angle at a light beam that passes through a vehicle outer side of the refractive optical system. As a method for differentiating the deflection angle between the inner side and the outer side, an asymmetric lens may be used, or an eccentric symmetric lens may be used.

Further, in the first and second exemplary embodiments, while second lens 123 is a Fresnel lens or a linear lens, it may be a lens having a Fresnel shape with uneven thickness.

Further, in the first and second exemplary embodiments, while one or two lens elements are used in projection optical system 120, three or more lens elements may be used.

Still further, in the first and second exemplary embodiments, while second lens 123 has a Fresnel facet on the upper side, the Fresnel facet may be disposed on the lower side.

Head-up display 100 is a head-up display that is mounted on a vehicle, performs projection on a transparent reflective member, and allows an observer to visually recognize a virtual image. Head-up display 100 may include an image generating apparatus (LCD) that generates an image, a projection optical system (a mirror side), and a controller. The projection optical system has a refractive optical system, and projects an image generated by the image generating apparatus on the reflective member. The controller shifts pixels of different wavelengths (colors) of an image generated by the image generating apparatus by a predetermined interval, so as to correct color shift of the image.

The controller of Head-up display 100 may make a correction so that the correction amount is asymmetric on right and left sides with respect to a center of the image.

The refractive optical system of head-up display 100 may eccentric with respect to the reference light beam.

In head-up display 100, a position of a displayed image corresponding to a center of a virtual image is a reference image, a position of a displayed image corresponding to a vehicle outer side end of the virtual image is a reference outer side image, and a position of a displayed image corresponding to a vehicle inner side end of the virtual image is a reference inner side image. At this time, the correction amount of the reference inner side image may be larger than the correction amount of the reference outer side image.

Head-up display 100 may satisfy the following condition:

$$1.5 \leq (Mi \times \theta 1o)/(Mo \times \theta 1i) \quad (2)$$

Here, $\theta 1i$ is an angle formed between a vector of a reference inner side light beam that is incident on the windshield and a vector of a reference inner side light beam reflected from the windshield;

$\theta 1o$ is an angle formed between a vector of a reference outer side light beam incident on the windshield and a vector of a reference outer side light beam reflected from the windshield;

Mi is a correction amount of reference inner side image Di; and

Mo is a correction amount of reference outer side image Do.

In head-up display 100, the correction amount of an image corresponding to blue may be larger than the correction amount of an image corresponding to red.

In head-up display 100, the correction amount may be adjusted according to the position of observer D.

The exemplary embodiments described above are illustrations of the technique of the present disclosure. Therefore, various changes, replacement, addition, or omission may be made to the exemplary embodiments within the scope of claims or their equivalents.

The present disclosure is applicable to a vehicular head-up display having a transparent reflective member and the like.

What is claimed is:

1. A head-up display that is mounted on a vehicle, performs projection on a transparent reflective member, and allows an observer to visually recognize a virtual image, the head-up display comprising:
   a display device that displays an image; and
   a projection optical system that has a refractive optical system, and projects the image displayed by the display device on an eye box of the observer,
   wherein:
   an inner deflection angle is formed between a vector of a light beam incident on the refractive optical system and a vector of a light beam output from the refractive optical system on an optical path that passes in a vicinity of an end of a vehicle inner side in a range from the display device to the refractive optical system, an outer deflection angle is formed between a vector of a light beam incident on the refractive optical system and a vector of a light beam output from the refractive optical system on an optical path that passes in a vicinity of an end of a vehicle outer side in the range from the display device to the refractive optical system, and the inner deflection angle is larger than the outer deflection angle.

2. The head-up display according to claim 1, satisfying a condition (1):

$$1.2 < (\theta 2i \times \theta 1o)/(\theta 2o \times \theta 1i) < 6.0 \quad (1)$$

wherein, $\theta 1i$ is an angle formed between a vector of a reference inner side light beam that is incident on the transparent reflective member and a vector of a reference inner side light beam that is reflected from the transparent reflective member;

$\theta 1o$ is an angle formed between a vector of a reference outer side light beam that is incident on the transparent reflective member and a vector of a reference outer side light beam that is reflected from the transparent reflective member;

$\theta 2i$ is an angle formed between a vector of a reference inner side light beam Li that is incident on a lens of the refractive optical system and a vector of a reference inner side light beam Li output from the lens of the refractive optical system; and $\theta 2o$ is an angle formed between a vector of a reference outer side light beam Lo that is incident on the lens of the refractive optical system and a vector of a reference outer side light beam Lo that is output from the lens of the refractive optical system.

3. The head-up display according to claim 2, wherein the refractive optical system is eccentric with respect to a reference light beam that is output from a center of a virtual image on an optical path of the displayed image.

4. The head-up display according to claim 3, wherein the refractive optical system has a greater curvature in a vehicle right-left direction than in a vehicle front-rear direction.

5. The head-up display according to claim 2, wherein the refractive optical system has a greater curvature in a vehicle right-left direction than in a vehicle front-rear direction.

6. The head-up display according to claim 1, wherein the refractive optical system is eccentric with respect to a reference light beam that is output from a center of a virtual image on an optical path of the displayed image.

7. The head-up display according to claim 6, wherein the refractive optical system has a greater curvature in a vehicle right-left direction than in a vehicle front-rear direction.

8. The head-up display according to claim 1, wherein the refractive optical system has a greater curvature in a vehicle right-left direction than in a vehicle front-rear direction.

9. A moving body comprising the head-up display according to claim 1.

* * * * *